United States Patent
Young et al.

(10) Patent No.: US 10,967,699 B2
(45) Date of Patent: Apr. 6, 2021

(54) SYSTEMS AND METHODS FOR REDUCING SLUGGING IN HVAC COMPRESSOR OF VEHICLE

(71) Applicant: PACCAR Inc, Bellevue, WA (US)

(72) Inventors: Mike Dragon Young, Sedro Woolley, WA (US); Uday Vadlamani, Burlington, WA (US)

(73) Assignee: Paccar Inc, Bellevue, WA (US)

( * ) Notice: Subject to any disclaimer, the term of this patent is extended or adjusted under 35 U.S.C. 154(b) by 0 days.

(21) Appl. No.: 16/005,501

(22) Filed: Jun. 11, 2018

(65) Prior Publication Data
US 2019/0375265 A1 Dec. 12, 2019

(51) Int. Cl.
*B60H 1/00* (2006.01)
*B60H 1/32* (2006.01)
*F24F 13/08* (2006.01)
*F25B 49/02* (2006.01)

(52) U.S. Cl.
CPC ....... *B60H 1/00021* (2013.01); *B60H 1/3213* (2013.01); *F24F 13/08* (2013.01); *F25B 49/022* (2013.01)

(58) Field of Classification Search
CPC ........ F25B 5/02; F25B 49/005; F25B 49/022; B60H 1/00378; B60H 1/323; B60H 1/00021; B60H 1/3213
USPC ........................................................ 165/202
See application file for complete search history.

(56) References Cited

U.S. PATENT DOCUMENTS

| | | | |
|---|---|---|---|
| 3,719,058 A * | 3/1973 | Waygood | B60H 1/323 62/200 |
| 5,910,159 A | 6/1999 | Matsuo et al. | |
| 6,543,245 B1 | 4/2003 | Waldschmidt et al. | |
| 2002/0121100 A1* | 9/2002 | Yabuki | F25B 49/005 62/228.1 |
| 2005/0044873 A1* | 3/2005 | Tamai | B60H 1/3208 62/323.1 |
| 2006/0254308 A1 | 11/2006 | Yokoyama et al. | |
| 2007/0131408 A1* | 6/2007 | Zeigler | B60H 1/00378 165/240 |
| 2015/0151609 A1* | 6/2015 | Satou | B60H 1/3204 165/63 |

(Continued)

OTHER PUBLICATIONS

Gary McCreadle, Refrigerant Pump Down Explained, Apr. 28, 2018, HVAC Know It All (Year: 2018).*

(Continued)

*Primary Examiner* — Davis D Hwu (57) ABSTRACT

Systems and methods for heating and cooling a vehicle are disclosed herein. In one embodiment, a method for heating and cooling the vehicle includes: running a compressor of an air-conditioning system; and sensing the temperature inside the cab of the vehicle. The method further includes, closing a path of refrigerant to the compressor by a solenoid valve, pumping-down refrigerant by the compressor, and deactivating the compressor when a lower set point of the temperature inside the cab is reached. The method also includes opening the path of refrigerant to the compressor by a solenoid valve, sensing pressure of refrigerant at an inlet of the compressor by a pressure sensor, and activating the compressor based on a signal from the pressure sensor when an upper set point of temperature inside cab is reached.

10 Claims, 6 Drawing Sheets

(56) References Cited

U.S. PATENT DOCUMENTS

2017/0167757 A1* 6/2017 Connell .................... F25B 5/02

OTHER PUBLICATIONS

European Extended Search Report in Application 19179000.5, dated Nov. 12, 2019, 7 pages.
European Communication in Application 19179000.5, dated Nov. 20, 2020, 4 pages.

* cited by examiner

SYSTEMS AND METHODS FOR REDUCING SLUGGING IN HVAC COMPRESSOR OF VEHICLE

BACKGROUND

Vehicle cabins typically include heating, ventilation and air-conditioning (HVAC) systems to keep drivers comfortable in different climates. Some vehicles, such as over-the-road trucks, include a sleeping compartment ("sleeper") attached to a cabin ("cab"). A driver may rest or sleep in the sleeper while a second driver operates the truck, or while the truck is parked, for example, overnight, during mandatory rest periods, etc. The cab and sleeper may share a common HVAC system, or may have dedicated systems for the cab and the sleeper.

Figure 1:
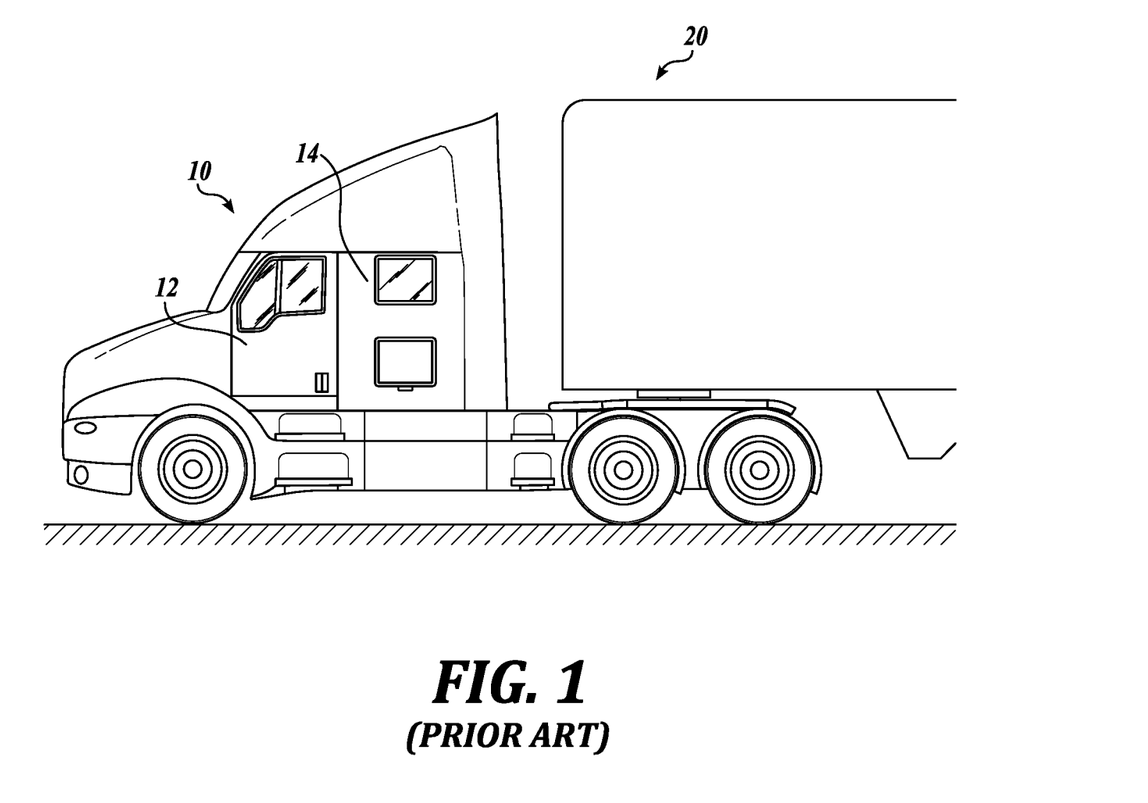
FIG. 1 is a side plan view of a truck in accordance with conventional technology.

FIG. 1 is a side plan view of a truck 10 in accordance with conventional technology. The truck ("tractor") 10 may be part of a tractor-trailer combination, which typically includes the tractor 10 having a so-called "fifth wheel" by which a box-like semi-trailer 20 may be attached for transporting cargo. The illustrated truck 10 includes a cab 12 and an attached sleeper 14. The heating and cooling system keeps the driver comfortable in the cab 12 and the sleeper 14.

Figure 2:
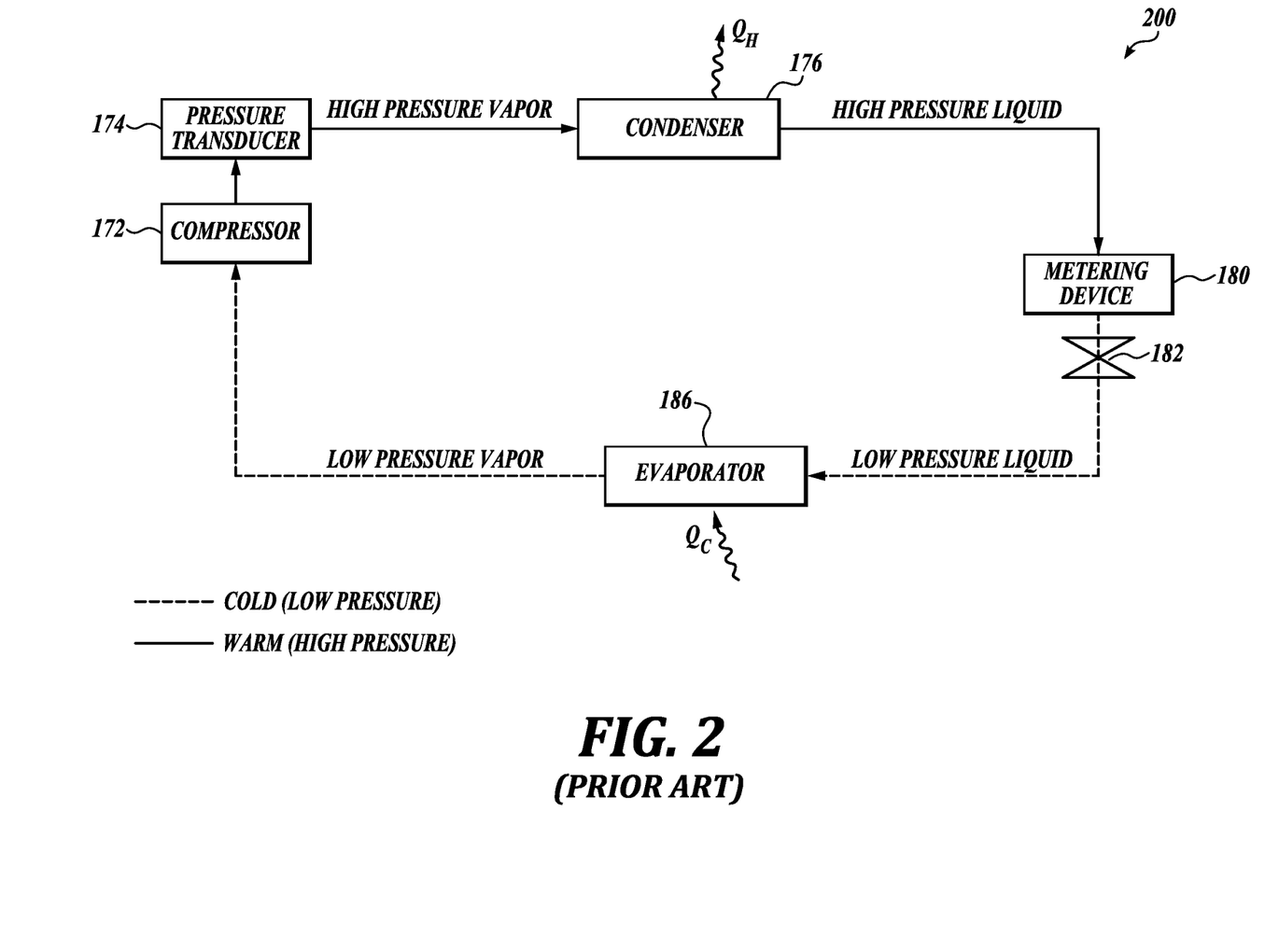
FIG. 2 is a schematic view of an air-conditioning system in accordance with conventional technology.

FIG. 2 is a schematic view of an air-conditioning system 200 in accordance with conventional technology. In operation, a compressor 172 compresses vapor refrigerant from a low pressure (shown as a dashed line) to a high pressure (shown as a solid line). The air-conditioning system includes a pressure transducer 174 for monitoring the pressure of the vapor at the outlet side of the compressor 172. The high pressure vapor is directed from the pressure transducer 174 (or directly from the compressor 172 when the pressure transducer is not used) to a condenser 176. As the condenser 176 rejects heat $Q_H$ to the environment, the high pressure vapor at the inlet of the condenser condenses into a high pressure liquid refrigerant at the outlet of the condenser. A metering device 180 may be included in the system 200 to measure the flow rate of liquid refrigerant. An expansion valve 182 reduces high pressure liquid refrigerant down to a low pressure liquid refrigerant.

Continuing with the operation of the air-conditioning system, the low pressure liquid refrigerant flows from the expansion valve 182 to an evaporator 186, where heat $Q_c$ is received from the environment (e.g., from the cab or sleeper). In response, low pressure liquid refrigerant evaporates into a low pressure vapor refrigerant. The low pressure vapor refrigerant returns to the compressor 172, and the cycle repeats.

With some conventional technologies, heating and cooling is provided by a heat pump that runs in a cooling mode (air-conditioning mode) when the outside temperature is high, and in a heating mode when the outside temperature is low. However, with these systems the compressor may be at a relatively low point (e.g., at the level of the vehicle transmission), which may even be the lowest point within the HVAC system. As a result, when the system is off, liquid refrigerant migrates toward the compressor, especially when the ambient temperature is low. Next, when the compressor starts, it attempts to compress the liquid refrigerant instead of the vapor refrigerant, which damages the compressor.

Accordingly, there remains a need for improved truck cab/sleeper heating and cooling systems that aims to address one or more problems of prior art systems.

SUMMARY

This summary is provided to introduce a selection of concepts in a simplified form that are further described below in the Detailed Description. This summary is not intended to identify key features of the inventive technology, nor is it intended to be used as an aid in determining the scope of the claimed subject matter.

Briefly, the inventive technology uses a heating, air-conditioning and ventilation (HVAC) system to provide cooling or heating to the cab/sleeper, as needed to keep the driver comfortable in different climate conditions. The HVAC system may operate as a heat pump to provide heating or cooling based on, for example, the position of a reversing valve. When operating in cooling mode, an evaporator of the heat pump absorbs energy from the cab/sleeper, thereby cooling down the cab/sleeper. Conversely, when operating in heating mode, the evaporator releases energy (heat) into the cab/sleeper.

Generally, when the compressor is turned off, liquid refrigerant accumulates at the inlet of the compressor, especially if the compressor is at a low point within the air-conditioning or heat pump system (e.g., at or close to the level of the transmission). When the compressor starts, it attempts to compress liquid refrigerant, which damages the compressor. This type of problem is referred to as "slugging" in the industry.

In some embodiments, before turning the compressor off a solenoid valve is activated to stop the flow of refrigerant to the compressor. The compressor continues to work for a while, therefore "pumping down" the remaining low-pressure vapor refrigerant toward the pressure transducer and the condenser. In some embodiments, a low pressure sensor (e.g., a low pressure switch) senses that a target low pressure of the vapor refrigerant is reached at the inlet of the compressor, and then turns off the compressor.

When the compressor needs to run again, the solenoid valve allows the flow of refrigerant through the evaporator toward the compressor. However, since the residual refrigerant at the inlet of the compressor is already "pumped down," no appreciable liquid refrigerant remains at the inlet to the compressor. Instead, the compressor compresses the newly supplied vapor refrigerant, which is a normal operating mode of the compressor, and is not damaging for the compressor.

If the refrigerant coming from the solenoid is still partially liquid, liquid refrigerant normally evaporates in the evaporator before reaching the compressor. In some embodiments, an accumulator is added at the inlet side of the compressor to store any residual liquid refrigerant and to prevent liquid refrigerant from entering the compressor.

In one embodiment, a method for controlling a temperature in a cab of a vehicle using an air-conditioning system includes: running a compressor of the air-conditioning system; sensing a temperature inside a cab of the vehicle; and, when a lower set point of the temperature inside cab is reached, closing a path of a refrigerant to the compressor; pumping-down the refrigerant by the compressor; and deactivating the compressor. In one aspect, the method of claim 1 also includes: opening the path of the refrigerant to the compressor, sensing a pressure of the refrigerant at an inlet of the compressor, and activating the compressor based on a signal from said sensing a pressure of the refrigerant. In another aspect, the sensing a pressure of the refrigerant is accomplished by a low pressure switch.

In one aspect, the refrigerant is at least partially held in an accumulator when the compressor does not operate. In another aspect, the air-conditioning system is a part of a heating, ventilation and air-conditioning (HVAC) system, and wherein the HVAC system is configured to operate as a heat pump. In different aspects, the HVAC system includes at least one evaporator in the cab of the vehicle and/or the HVAC system includes at least one evaporator in a sleeper of the vehicle. In one aspect, the at least one evaporator in the sleeper of the vehicle and the at least one evaporator in the cab of the vehicle are configured within parallel paths of the refrigerant.

In one aspect, the method of claim 8 includes: controlling a flow of the refrigerator in the at least one evaporator in the cab of the vehicle by a first check valve; and controlling the flow of the refrigerator in the at least one evaporator in the sleeper of the vehicle by a second check valve. In another aspect, the compressor is powered off a transmission of the vehicle. In one aspect, the compressor is at a lower point than other components of the air-conditioning system. In one aspect, the compressor and the transmission are connected through a clutch. In another aspect, the compressor is powered off a battery.

In one embodiment, a system for air-conditioning a vehicle includes: a compressor in an engine compartment of the vehicle; an evaporator in a cab of the vehicle; a control valve that controls a flow of a refrigerant to the compressor; a temperature sensor that senses a temperature of air in a cab of the vehicle; and a controller. The controller can issue instructions to: receive a signal from the temperature sensor, and when a lower set point of the temperature inside cab is reached, close the control valve to close a path of the refrigerant to the compressor, run the compressor to pump-down the refrigerant, and upon receiving a pressure signal from a pressure sensor, deactivate the compressor. In one aspect, the controller is configured to issue instructions to: open the control valve to open the path of the refrigerant to the compressor; receive the pressure signal from the pressure sensor; and activate the compressor based on the signal from the pressure sensor.

In one aspect, the system includes a clutch for engaging the compressor with a transmission of the vehicle. In another aspect, the system also includes a battery for energizing the compressor of the heat pump. In one aspect, the air-conditioning system is a part of a heating, ventilation and air-conditioning (HVAC) system, and the HVAC system operates as a heat pump. In one aspect, the evaporator is a first evaporator, the system further having a second evaporator in a sleeper of the vehicle.

In one aspect, the first evaporator in the cab of the vehicle and the second evaporator in the sleeper of the vehicle are configured within parallel paths of the refrigerant. In another aspect, the system further also includes a first check valve for controlling a flow of the refrigerator in first evaporator in the cab of the vehicle; and a second check valve for controlling the flow of the refrigerator in the second evaporator in the sleeper of the vehicle.

DESCRIPTION OF THE DRAWINGS

The foregoing aspects and the attendant advantages of the inventive technology will become more readily appreciated as the same become better understood by reference to the following detailed description, when taken in conjunction with the accompanying drawings, wherein.

DETAILED DESCRIPTION

The following disclosure describes various embodiments of systems and associated methods for heating and cooling a vehicle using a heat pump. A person skilled in the art will also understand that the inventive technology may have additional embodiments, and that the technology may be practiced without several of the details of the embodiments described below with reference to FIGS. 3-6.

Although exemplary embodiments of the present disclosure will be described hereinafter with reference to a vehicle, such as a heavy duty truck, it will be appreciated that aspects of the present disclosure have wide application, and therefore, may be suitable for use with many other types of vehicles, including but not limited with passenger vans, motor homes, buses, marine vessels, etc. Accordingly, the following descriptions and illustrations herein should be considered illustrative in nature, and thus, not limiting the scope of the claimed subject matter.

Figure 3:
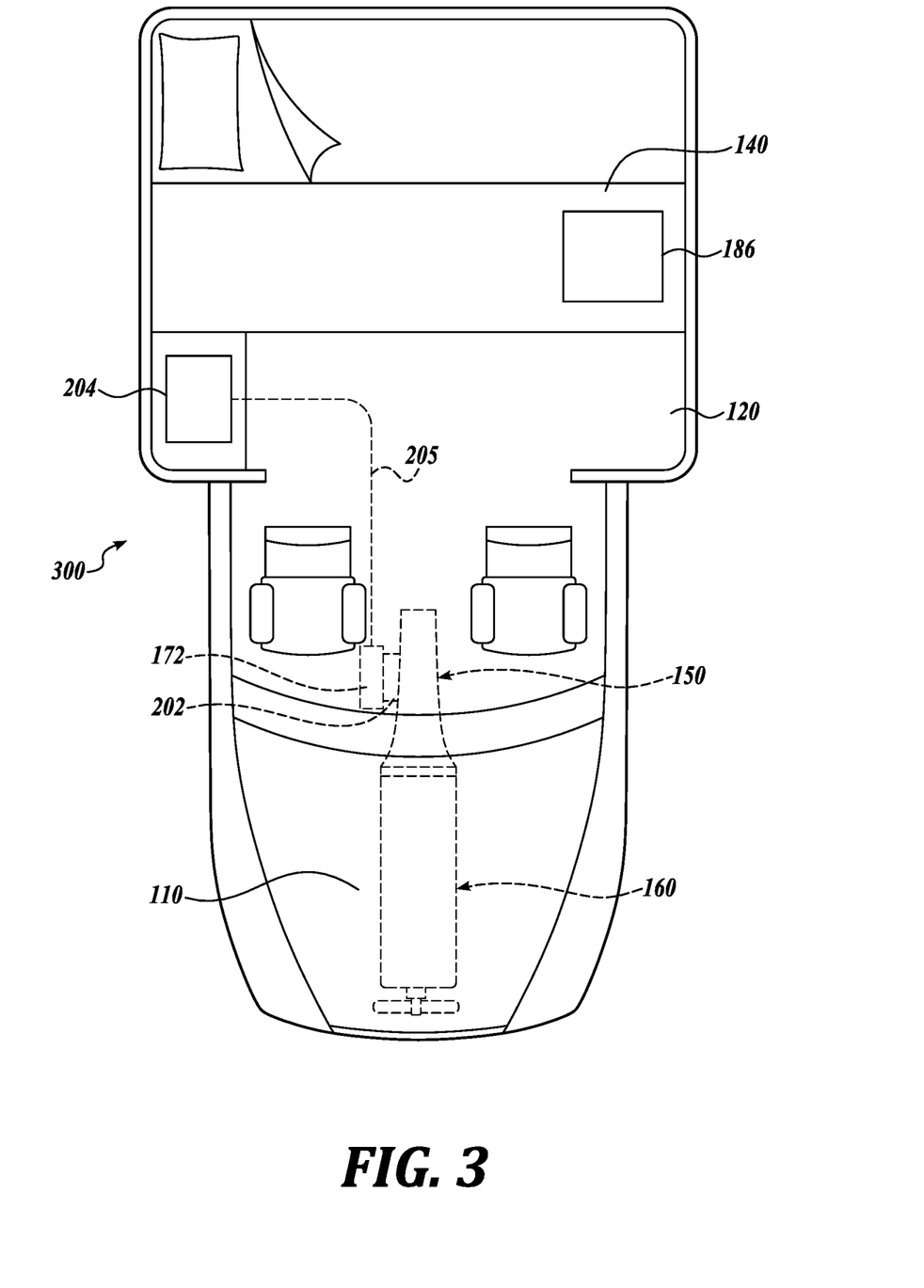
FIG. 3 is a schematic view of energizing a compressor in accordance with an embodiment of the present technology.

FIG. 3 is a schematic view of energizing a compressor in accordance with an embodiment of the present technology. A vehicle 300 (e.g., a tractor, such as a class 8 truck) includes a sleeper 140 attached to a cab 120. In operation, the evaporator 186 can cool or heat the sleeper 140 and/or the cab 120. In the illustrated embodiment, the evaporator 186 is located in the sleeper 140, but in different embodiments the evaporator may be located in the cab 120, or in both the sleeper and the cab.

As shown in FIG. 3, an engine compartment 110 houses an engine 160 that is coupled to a transmission 150 for transmitting power to the drive wheels (not shown). In some embodiments, a compressor 172 draws power off the transmission 150 through a clutch 202. When the engine 160 is not running, a battery 204 may provide power to the compressor 172 through an electrical cable 205. In some embodiments, the battery 204 is a main battery of the vehicle 300. In other embodiments, the battery 204 is an auxiliary battery or "house" battery dedicated to powering the compressor 172 alone or in addition to other "house" loads (e.g., lights, infotainment system, etc). Since the transmission 150 tends to occupy a low point on the vehicle 300, the compressor 172 may also be at a lower point than the other components of the HVAC system. Generally, a relatively low location of the compressor 172 may cause slugging when the compressor starts. Some embodiments of the present technology aim to eliminate, or at least reduce the incidence of slugging, and are described with reference to FIG. 4 below.

Figure 4:
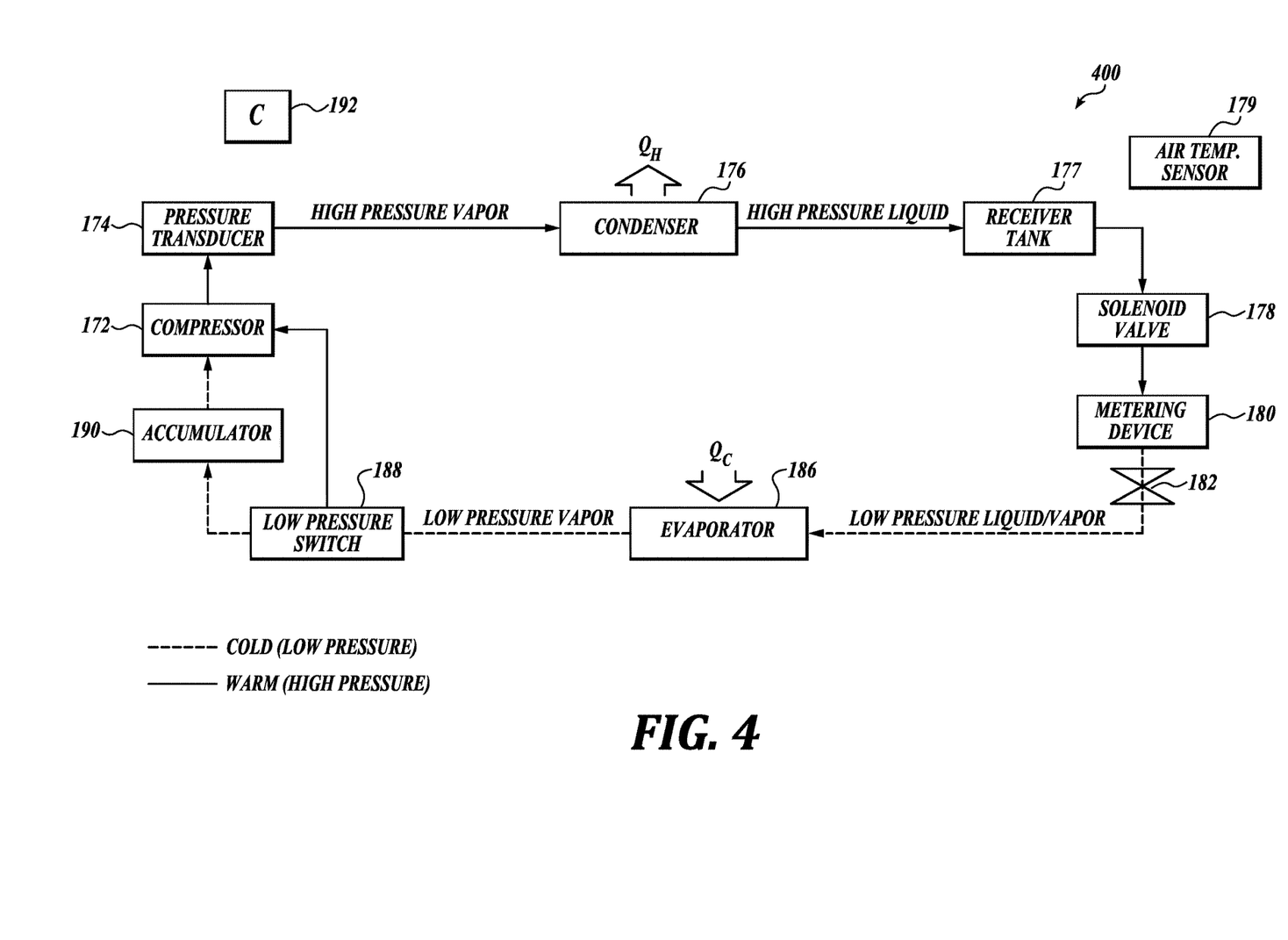
FIG. 4 is a schematic view of an air-conditioning system in accordance with an embodiment of the present technology.

FIG. 4 is a schematic view of an air-conditioning system 400 in accordance with an embodiment of the present technology. In operation, the compressor 172 compresses vapor refrigerant from a low pressure (shown as a dashed line in FIG. 4) to a high pressure (shown as a solid line in FIG. 4). In some embodiments, the air-conditioning system 400 includes a pressure transducer 174 for monitoring the pressure of the vapor at the outlet side of the compressor 172.

After exiting the compressor 172, the high pressure vapor enters the condenser heat exchanger 176 that rejects heat $Q_H$ to the environment. In the process, high pressure vapor at the inlet of the condenser heat exchanger 179 condenses into high pressure liquid. In some embodiments, a receiver tank (also referred to as a "drier tank") 177 temporarily stores the liquid refrigerant.

During normal operation of the compressor, a solenoid valve 178 is opened, therefore allowing liquid refrigerant to proceed to a metering device 180 (e.g., flow and/or temperature metering device). In some embodiments, the solenoid valve opens when energized at its operating voltage, and closes when de-energized. In other embodiments, the valve 178 may be another energize-able valve capable of opening and closing the path of the liquid refrigerant. For example, a pneumatically driven valve, a stepper motor drive valve, or a hydraulically driven valve may be used in different embodiments. Therefore, the term "solenoid valve" encompasses different energize-able valves.

Liquid refrigerant flows through an expansion valve 182, and expands into low pressure liquid refrigerant or into a mixture of low pressure liquid and vapor. Low pressure liquid refrigerant flows from the expansion valve 182 to an evaporator (also referred to as an "evaporator heat exchanger") 186, where heat $Q_c$ is received from the environment. In response to receiving heat $Q_c$ by the evaporator, low pressure liquid refrigerant evaporates into a low pressure vapor. In some embodiments, the evaporator 186 is positioned at either the sleeper 140 or the cab 120.

During normal operation of the compressor, low pressure vapor continues to flow to an accumulator 190 at a pressure that is higher than a threshold value of a low pressure sensor (also referred to as a low pressure switch) 188. The low pressure vapor next flows to the compressor 172, and the cycle repeats.

The "pump-down" regime and restarting the compressor are discussed below. In some embodiments, an air temperature sensor 179 indicates the temperature of the cab/sleeper. When the set temperature for the cab/sleeper is reached, the air temperature sensor 179 sends a signal to a controller 192, and the system 400 may be turned off. For example, in cooling mode, when the temperature of the cab/sleeper falls below a set point ("lower set point"), the system 400 may be turned off. In time, the temperature of the cab/sleeper gradually increases because of heat loss; the temperature exceeds the set point; and the system 400 is turned on again.

In some embodiments, when the set point is reached, causing the system 400 to enter a shut-down process, the solenoid valve 178 stops the flow of refrigerant while the compressor 172 continues to operate. For example, de-energizing the solenoid 178 may stop the flow of refrigerant. As the compressor 172 continues to "pump-down" remaining refrigerant, pressure drops in the evaporator 186, accumulator 190 and the piping at the inlet of the compressor. In some embodiments, a low pressure switch 188 senses pressure, and when a threshold value is reached the low pressure switch sends a signal to stop the compressor 172. In some embodiments, the low pressure switch may communicate with the controller 192, which in turn controls the compressor 172. In some embodiments the controller 192 may control other parts of the system 400, for example the solenoid valve 178.

After the compressor is stopped, the piping and components between the solenoid valve 178 and the compressor 172 contain a relatively small amount of low pressure vapor refrigerant. In some embodiments, even after a relatively long period of time, vapor refrigerant having a relatively high specific volume, cannot condense to liquid refrigerant even at the lowest point of the system, which may be the compressor 172.

As the temperature in the cab/sleeper gradually increases, the set point ("the upper set point") is reached for turning the system 400 back on, and the solenoid valve 178 opens the flow of refrigerant toward the expansion valve 182, where liquid refrigerant evaporates and flows toward the compressor 172. As the pressure of the refrigerant increases with the inflow of low pressure vapor, the low pressure switch 188 senses an increase in pressure. When the pressure of the refrigerant reaches a pre-determined threshold, the low pressure switch 188 sends a signal to the compressor 172, or to the controller 192 to turn the compressor back on. Since the refrigerant at the inlet of the compressor 172 is low pressure vapor, or at least predominantly vapor and not liquid refrigerant, the compressor 172 is not subject to slugging, or the incidence of slugging is at least reduced.

In some embodiments, the system 400 may operate as a heat pump. For example, the system 400 may include a 4-way reversing valve (not shown) that connects different components of the system depending on the desired mode of operation of the heat pump. For example, when the heat pump operates in cooling mode, high pressure vapor is directed from the pressure transducer 174 (or directly from the compressor 172 when the pressure transducer is not used) to the condenser heat exchanger 176. Conversely, when the heat pump operates in heating mode, the reversing valve directs high pressure vapor from the compressor 172 to the evaporator heat exchanger 186, therefore providing heating to the cab or cabin. In heating mode, the 4-way reversing valve also directs low pressure vapor from the condenser heat exchanger 176 to the compressor 172.

Figure 5:
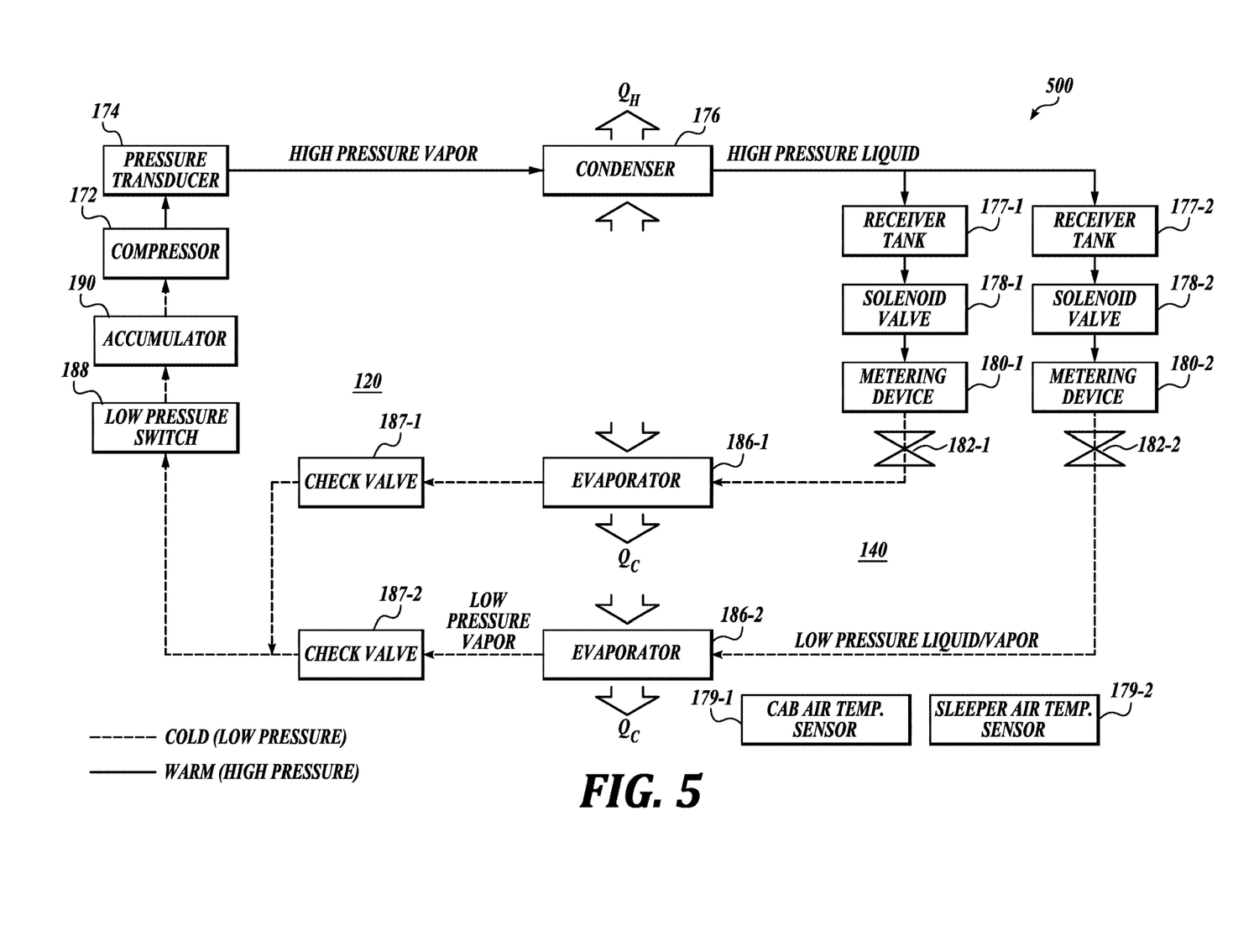
FIG. 5 is a schematic view of an air-conditioning system having multiple evaporator loops in accordance with an embodiment of the present technology.

FIG. 5 is a schematic view of an air-conditioning system 500 having multiple evaporator loops in accordance with an embodiment of the present technology. As explained above, in some embodiments the heat pump system may replace the air-conditioning system. Therefore, the heat pump systems are also encompassed when referring to the air-conditioning systems.

In some embodiments, the cab 120 and 140 may have separate evaporators. For example, evaporators 186-1 and 186-2 may be configured in the cab 120 and the sleeper 140 to receive low pressure vapor refrigerant from expansion valves 182-1 and 182-2. In some embodiments, check valves 187-1 and 187-2 control the flow of low pressure vapor refrigerant through evaporators 186-1 and 186-2. For example, the opening/closing of check valves 187-1 and 187-2 may be based on temperature readings by a cab air temperature sensor 179-1 and a sleeper air temperature sensor 179-2 respectively, therefore providing improved comfort for the driver based on independent control of the temperature in the cab and the sleeper. In some embodiments, check valves 187-1 and 187-2 are one-way valves. When one of the check valves 187-1 or 187-2 is closed, unwanted recirculation from one evaporator to another is prevented.

Figure 6:
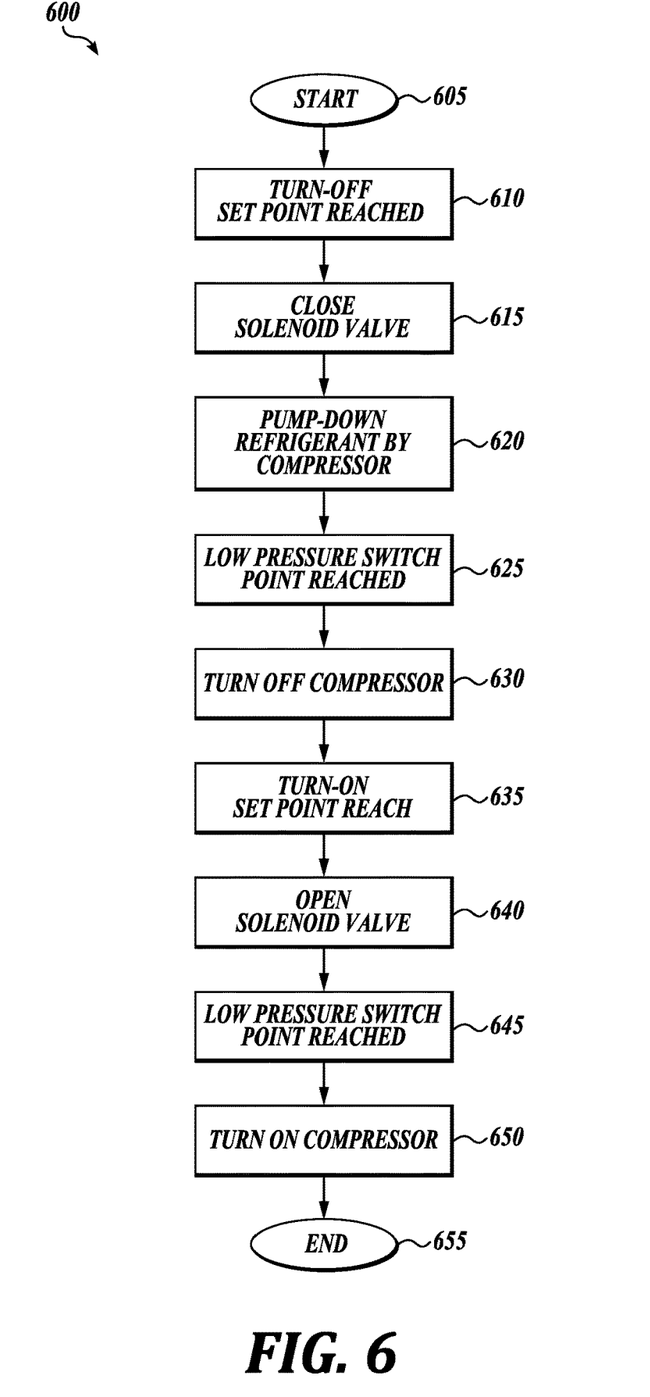
FIG. 6 is a flowchart of a method for controlling an HVAC system in accordance with an embodiment of the present technology.

FIG. 6 is a flowchart of a method 600 for controlling the HVAC system in accordance with an embodiment of the present technology. In some embodiments, the method may include only some of the steps in the flowchart, or may include additional steps that are not illustrated in the flowchart 600. It will be appreciated that some of the steps described below can be carried out in parallel, serially, or in an order different than set forth in FIG. 6 and described below.

The method starts in block 605. In block 610, the air temperature sensor of the air-conditioning system has reached its turn-off set point. For example, if the sleeper is cooled, the temperature of the sleeper has reached its low set point. As another example, if the cab is heated by the heat pump, the temperature of the cab has reached its upper set point. Having sensed the set point, the air temperature sensor sends an appropriate signal to the controller of the system.

In block 615, the controller issues a command to close the solenoid valve, thereby shutting the flow of refrigerant to the compressor. In some embodiments, the solenoid valve is de-energized to close the flow of refrigerant.

In block 620, the compressor continues to pump-down the remaining refrigerant in the components and pipes between the solenoid valve and the inlet of the compressor. In response, the pressure of the refrigerant is lowered at the inlet of the compressor.

In block 625, the low pressure switch reaches a set point indicating that a predetermined low pressure has been reached at the inlet of the compressor, and the low pressure switch sends a signal to the compressor or to the controller. In block 630, the compressor is turned off. However, because the solenoid valve is closed, the path of the refrigerant to the compressor is closed and the accumulation of refrigerant at the compressor inlet is prevented or at least minimized. Consequently, condensation of the residual amount of refrigerant at the compressor inlet is prevented or at least minimized because of a relatively high specific volume of vapor refrigerant at the inlet of the compressor.

When the air-conditioning system does not operate, heat loss from the environment gradually raises the temperature of the cab or the sleeper, and the air temperature sensor of the air-conditioning system reaches its turn-on set point in block 635. In block 640, the solenoid valve opens to allow the flow of refrigerant again. In some embodiments, the solenoid valve is energized into its open position.

In block 645, the flow of refrigerant increases pressure at the inlet of the compressor. The low pressure switch senses this increased pressure, and sends a signal to the controller or the compressor.

In block 650, the compressor is turned on, and the air-conditioning system operates again to, for example, lower the temperature of the cab and/or sleeper. However, since the amount of refrigerant at the inlet of the compressor was restricted, as explained above, the incidence of slugging is eliminated or at least reduced. The method ends in block 655.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. Of course, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A system for air-conditioning a vehicle, comprising:
   a compressor configured in an engine compartment of the vehicle;
   a first evaporator configured in a cab of the vehicle;
   a second evaporator configured in a sleeper of the vehicle;
   a first one-way check valve permitting flow from the first evaporator to the compressor via a first refrigerant line;
   a second one-way check valve permitting flow from the second evaporator to the compressor via a second refrigerant line, wherein the first refrigerant line and the second refrigerant line are joined at a junction between the first evaporator and the compressor and between the second evaporator and the compressor, and wherein the first one-way check valve is configured between the first evaporator and the junction and the second one-way check valve is configured between the second evaporator and the junction;
   a control valve configured to control flow of a refrigerant to the compressor;
   an accumulator configured between the junction and the compressor for storing at least some of the refrigerant;
   a temperature sensor configured to sense a temperature of air in a cab of the vehicle; and
   a controller configured to issue instructions to:
      receive a signal from the temperature sensor, and
      when a lower set point of the temperature inside cab is reached:
         close the control valve to close a path of the refrigerant to the compressor,
         run the compressor to pump-down the refrigerant, and
         upon receiving a pressure signal from a pressure sensor, deactivate the compressor.

2. The system of claim 1, wherein the controller is further configured to issue instructions to:
   open the control valve to open the path of the refrigerant to the compressor;
   receive the pressure signal from the pressure sensor; and
   activate the compressor based on the signal from the pressure sensor.

3. The system of claim 1, further comprising a clutch configured to engage the compressor with a transmission of the vehicle.

4. The system of claim 1, further comprising a battery configured to energize the compressor.

5. The system of claim 1, wherein the air-conditioning system is a part of a heating, ventilation and air-conditioning (HVAC) system, and wherein the HVAC system is configured to operate as a heat pump.

6. A system for air-conditioning a vehicle, comprising:
   a compressor configured in an engine compartment of the vehicle;
   a first evaporator configured in a cab of the vehicle;
   a second evaporator configured in a sleeper of the vehicle;
   a first one-way check valve permitting flow from the first evaporator to the compressor via a first refrigerant line;
   a second one-way check valve permitting flow from the second evaporator to the compressor via a second refrigerant line, wherein the first refrigerant line and the second refrigerant line are joined at a junction between the first evaporator and the compressor and between the second evaporator and the compressor, and wherein the first one-way check valve is configured between the first evaporator and the junction and the second one-way check valve is configured between the second evaporator and the junction;

a control valve configured to control flow of a refrigerant to the compressor through one or more of the first evaporator and the second evaporator;

an accumulator configured between the junction and the compressor for storing at least some of the refrigerant;

a temperature sensor configured to sense a temperature of air in a cab of the vehicle; and a controller configured to issue instructions to:
  receive a signal from the temperature sensor, and
  when a lower set point of the temperature inside cab is reached:
    close the control valve to close a path of the refrigerant to the compressor,
    run the compressor to pump-down the refrigerant, and
    upon receiving a pressure signal from a pressure sensor, deactivate the compressor.

7. The system of claim 6, wherein the controller is further configured to issue instructions to:
  open the control valve to open the path of the refrigerant to the compressor;
  receive the pressure signal from the pressure sensor; and
  activate the compressor based on the signal from the pressure sensor.

8. The system of claim 6, further comprising a clutch configured to engage the compressor with a transmission of the vehicle.

9. The system of claim 6, further comprising a battery configured to energize the compressor.

10. The system of claim 6, wherein the air-conditioning system is a part of a heating, ventilation and air-conditioning (HVAC) system, and wherein the HVAC system is configured to operate as a heat pump.

* * * * *